United States Patent
Oyama et al.

(10) Patent No.: US 8,738,211 B2
(45) Date of Patent: May 27, 2014

(54) CONTROL APPARATUS FOR VEHICLE

(71) Applicants: Shunsuke Oyama, Aichi-gun (JP); Yoichi Tajima, Anjo (JP); Tomokazu Nomura, Anjo (JP)

(72) Inventors: Shunsuke Oyama, Aichi-gun (JP); Yoichi Tajima, Anjo (JP); Tomokazu Nomura, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 19 days.

(21) Appl. No.: 13/961,472

(22) Filed: Aug. 7, 2013

(65) Prior Publication Data

US 2013/0324358 A1  Dec. 5, 2013

Related U.S. Application Data

(63) Continuation of application No. 13/379,221, filed as application No. PCT/IB2010/001311 on Jun. 1, 2010, now Pat. No. 8,565,955.

(30) Foreign Application Priority Data

Jun. 19, 2009  (JP) ................. 2009-146912

(51) Int. Cl.
*F16H 61/04*  (2006.01)
*B60L 11/12*  (2006.01)
*G06F 19/00*  (2011.01)

(52) U.S. Cl.
USPC ................. 701/22; 701/53; 474/11

(58) Field of Classification Search
USPC ........... 701/22, 53, 54, 101; 474/11; 180/65.2
See application file for complete search history.

(56) References Cited

U.S. PATENT DOCUMENTS

| 6,066,070 A | 5/2000 | Ito et al. |
| 6,244,986 B1 | 6/2001 | Mori et al. |
| 8,014,926 B2 | 9/2011 | Sawada |
| 2003/0158639 A1 | 8/2003 | Nada |
| 2006/0014606 A1 | 1/2006 | Sporl et al. |

(Continued)

FOREIGN PATENT DOCUMENTS

| CN | 1482020 A | 3/2004 |
| EP | 0 953 470 | 11/1999 |

(Continued)

OTHER PUBLICATIONS

International Search Report Issued Sep. 21, 2010 in PCT/IB10/01311 filed Jun. 1, 2010.

(Continued)

*Primary Examiner* — Tan Q Nguyen
(74) *Attorney, Agent, or Firm* — Oblon, Spivak, McClelland, Maier & Neustadt, L.L.P.

(57) ABSTRACT

A control apparatus for a vehicle is provided for a vehicle that has a normal mode and a power mode as vehicle driving characteristics. The control apparatus includes a continuously variable transmission mechanism that steplessly changes a speed ratio when rotational driving force of an engine output shaft is transmitted to a rotating output shaft; and a control portion that controls the continuously variable transmission mechanism such that, when a rotation speed is increased to a target rotation speed and a required output of an internal combustion engine when the power mode is selected is the same as when the normal mode is selected, the rate of increase in the rotation speed is greater when the power mode is selected than when the normal mode is selected.

4 Claims, 4 Drawing Sheets

(56) References Cited

U.S. PATENT DOCUMENTS

| | | | |
|---|---|---|---|
| 2006/0035749 | A1 | 2/2006 | Kanafani et al. |
| 2007/0142167 | A1 | 6/2007 | Kanafani et al. |
| 2008/0300768 | A1 | 12/2008 | Hijikata |
| 2009/0264231 | A1* | 10/2009 | Ogata et al. ............ 474/11 |
| 2012/0072064 | A1 | 3/2012 | Kumazaki et al. |
| 2012/0271498 | A1* | 10/2012 | Kobayashi ............ 701/22 |

FOREIGN PATENT DOCUMENTS

| | | |
|---|---|---|
| JP | 59 212566 | 12/1984 |
| JP | 4 370468 | 12/1992 |
| JP | 10 98805 | 4/1998 |
| JP | 11 63194 | 3/1999 |
| JP | 2006 138306 | 6/2006 |
| JP | 2007 91073 | 4/2007 |

OTHER PUBLICATIONS

Japanese Office Action Issued Apr. 26, 2011 in Patent Application No. 2009-146912 filed on Jun. 19, 2009 (with partial English translation).

* cited by examiner

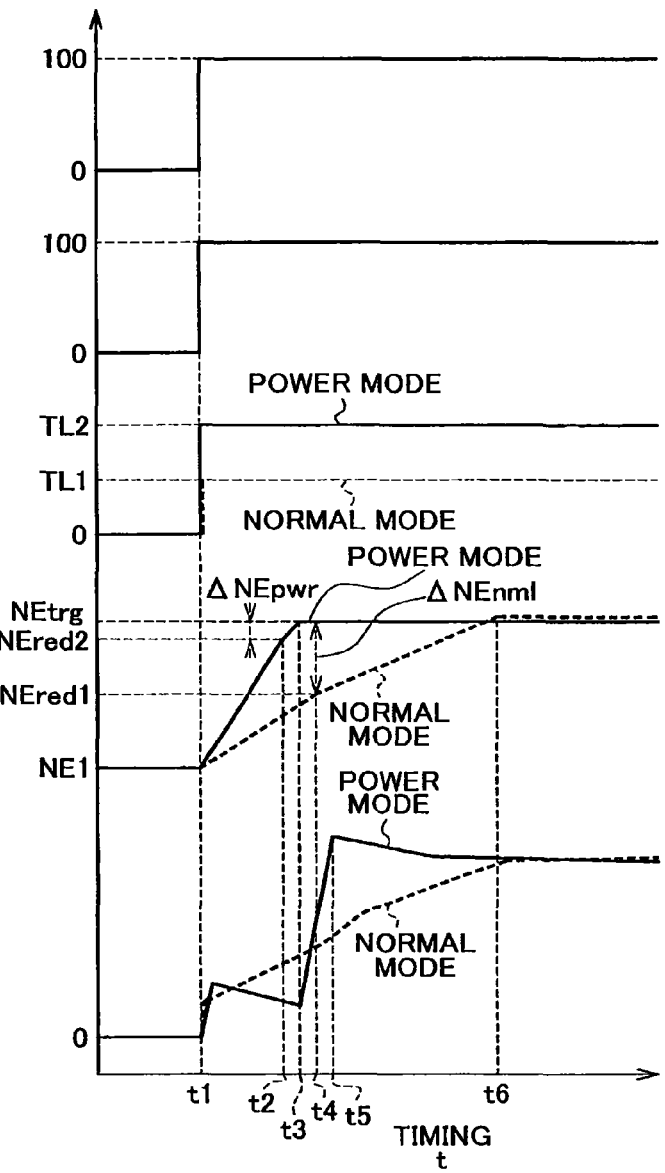

CONTROL APPARATUS FOR VEHICLE

CROSS-REFERENCE TO RELATED APPLICATIONS

This application is a continuation of U.S. application Ser. No. 13/379,221 filed Dec. 19, 2011, which is the National Stage Application of PCT International Application Serial No. PCT/IB10/01311 filed Jun. 1, 2010, which claims priority to Japanese Application No. 2009-146912 filed Jun. 19, 2009. The entire content of U.S. application Ser. No. 13/379, 221 filed Dec. 19, 2011, is incorporated herein by reference.

FIELD OF THE INVENTION

The invention relates to a control apparatus for a vehicle that is applied to a vehicle in which rotational driving force of an engine output shaft that is an output shaft of an internal combustion engine is transmitted to driving wheels via a rotating output shaft, and that has a normal mode and a power mode as vehicle driving characteristics.

DESCRIPTION OF THE RELATED ART

Japanese Patent Application Publication No. 2007-091073 (JP-A-2007-091073), for example, describes one such known control apparatus for a vehicle. One kind of typical related control apparatus for a vehicle, including that described in JP-A-2007-091073, has a normal mode and a power mode as vehicle driving characteristics in order to meet the high requirements of the driver for driving force. This control apparatus changes the vehicle driving characteristic by changing the output characteristic of the internal combustion engine according to the mode selected. More specifically, the opening amount of the throttle valve with respect to the accelerator operation amount is controlled to be larger when the power mode is selected than it is when the normal mode is selected. This kind of control enables a greater feeling of acceleration to be obtained when the power mode is selected than is obtained when the normal mode is selected.

In the related control apparatus for a vehicle described above, the vehicle driving characteristic is changed by changing the control characteristic of the opening amount of the throttle valve with respect to the accelerator operation amount so that it is different for the normal mode than it is for the power mode. Therefore, when the vehicle is accelerating with the accelerator pedal fully depressed, the following problem may arise. When the accelerator pedal is fully depressed, the throttle becomes fully open as a result, so the required output of the internal combustion engine is the same when the power mode is selected as it is when the normal mode is selected. In this case, the opening amount of the throttle valve is unable to be increased any more with respect to the accelerator operation amount. Therefore, even though the power mode is selected, a greater feeling of acceleration than when the normal mode is selected is unable to be obtained.

SUMMARY OF THE INVENTION

This invention thus provides a control apparatus for a vehicle that enables a greater feeling of acceleration to be obtained when a power mode is selected than when a normal mode is selected, even if the required output of an internal combustion engine is the same when the power mode is selected as it is when the normal mode is selected.

One aspect of the invention relates to a control apparatus for a vehicle, the vehicle being structured such that rotational driving force of an engine output shaft that is an output shaft of an internal combustion engine is transmitted to a driving wheel via a rotating output shaft, and having a normal mode and a power mode as vehicle driving characteristics. This control apparatus includes a continuously variable transmission mechanism that steplessly changes a speed ratio when the rotational driving force of the engine output shaft is transmitted to the rotating output shaft, and a control portion that controls the continuously variable transmission mechanism such that, when a rotation speed of the engine output shaft is increased to a target rotation speed and a required output of the internal combustion engine when the power mode is selected is the same as when the normal mode is selected, the rate of increase in the rotation speed of the engine output shaft is greater when the power mode is selected than when the normal mode is selected.

According to this aspect of the invention, when the required output of the internal combustion engine is the same when the power mode is selected as it is when the normal mode is selected, the rate of increase of the rotation speed of the engine output shaft is made larger by controlling the continuously variable transmission mechanism when the power mode is selected than it is when the normal mode is selected. This kind of control enables the rotation speed of the engine output shaft to be quickly increased to the target rotation speed. Increasing the percentage of output from the internal combustion engine that contributes to the increase in the rotation speed of the engine output shaft in this way results in a decrease in the percentage of output from the internal combustion engine that contributes to an increase in driving force transmitted to the rotating output shaft, and thus a decrease in the acceleration of the vehicle until the rotation speed of the engine output shaft reaches the target rotation speed. However, once the rotation speed of the engine output shaft has reached to the target rotation speed, the majority of the output from the internal combustion engine is contributed to increasing the driving force transmitted to the rotating output shaft, so the acceleration of the vehicle abruptly increases. Therefore, the acceleration of the vehicle can be quickly increased to a predetermined acceleration. Also, the rate of increase when increasing the acceleration of the vehicle, i.e., the so-called jerk, is able to be made large. Therefore, a greater feeling of acceleration can be obtained when the power mode is selected than when the normal mode is selected, even if the required output of the internal combustion engine is the same when the power mode is selected as it is when the normal mode is selected.

In the aspect of the invention described above, the vehicle may be such that a throttle valve of the internal combustion engine is fully open when an accelerator operation amount is substantially equal to the maximum amount. Also, when the rotation speed of the engine output shaft is increased to the target rotation speed when the accelerator operation amount is substantially equal to the maximum amount, the control portion may control the continuously variable transmission mechanism such that the rate of increase of the rotation speed of the engine output shaft is greater when the power mode is selected than when the normal mode is selected. In a vehicle in which the throttle valve is fully open when accelerator operation amount is substantially equal to the maximum amount, the required output of the internal combustion engine is the same when the accelerator operation amount is substantially equal to the maximum amount. Therefore, if this aspect of the invention is applied when a vehicle is accelerating with the accelerator operation amount being substantially equal to the maximum amount, a greater feeling of acceleration can be obtained when the power mode is selected than when the normal mode is selected.

In the control apparatus described above, when the rotation speed of the engine output shaft is increased to the target rotation speed when the power mode is selected, the control portion may control the continuously variable transmission mechanism such that the driving force transmitted to the rotating output shaft, of the output from the internal combustion engine, decreases.

According to this structure, when the rotation speed of the engine output shaft is increased to the target rotation speed when the power mode is selected, the output of the internal combustion engine that contributes to an increase of the rotation speed of the engine output shaft increases by the amount that the driving force transmitted to the rotating output shaft, of the output of the internal combustion engine, decreases. Therefore, the rotation speed of the engine output shaft can be increased to the target rotation speed even more quickly, which enables the acceleration of the vehicle to be increased even more quickly to a predetermined acceleration. Also, the jerk of the vehicle can be made large. Therefore, an even greater feeling of acceleration can be obtained when the power mode is selected than when the normal mode is selected, even if the required output of the internal combustion engine is the same when the power mode is selected as it is when the normal mode is selected.

In the control apparatus described above, when the rotation speed of the engine output shaft is increased to the target rotation speed when the normal mode is selected, the control portion may control the continuously variable transmission mechanism such that the driving force transmitted to the rotating output shaft, of the output from the internal combustion engine, increases. Incidentally, in combination with this, when the power mode is selected, for example, the control portion may control the continuously variable transmission mechanism such that the driving force transmitted to the rotating output shaft, of the output from the internal combustion engine, increases until the rotation speed of the engine output shaft reaches the target rotation speed. However, in this case as well, it is necessary to increase the rate of increase when increasing the rotation speed of the engine output shaft to the target rotation speed when the power mode is selected compared with when the normal mode is selected.

In the control apparatus described above, the control portion may reduce the rate of increase of the rotation speed of the engine output shaft after the rotation speed of the engine output shaft has been increased to a predetermined rotation speed that is lower than the target rotation speed, and set the predetermined rotation speed higher when the power mode is selected than when the normal mode is selected.

If the rotation speed of the engine output shaft is abruptly stopped from increasing after it has increased to the target rotation speed, the sudden change in acceleration of the engine rotation speed will jolt parts of the internal combustion engine, which may result in mechanical damage to the internal combustion engine. Therefore, the rate of increase of the rotation speed of the engine output shaft after the rotation speed of the engine output shaft has increased to a predetermined rotation speed that is lower than the target rotation speed is reduced to inhibit the internal combustion engine from being mechanically damaged. According to this structure, the rotation speed of the engine output shaft can be increased even more quickly to the target rotation speed by setting the predetermined rotation speed for reducing the rate of increase of the rotation speed of the engine output shaft higher when the power mode is selected than when the normal mode is selected. As a result, the acceleration of the vehicle can be increased to a predetermined acceleration even more quickly, and the jerk of the vehicle can be made even larger.

The control apparatus described above may also include a hybrid power system that has a generator; an output splitting mechanism that distributes a portion of the output from the internal combustion engine to the rotating output shaft and distributes the rest of the output from the internal combustion engine to the generator; a power storage device that is charged with the electric power generated by the generator; and an electric motor that is driven by at least one of the electric power from the generator or the electric power from the power storage device, and transmits power to the rotating output shaft. Also, the continuously variable transmission mechanism may steplessly change the speed ratio when the rotational driving force of the engine output shaft is transmitted to the rotating output shaft, by operational control of the generator.

According to the structure described above, the speed ratio when the rotational driving force of the engine output shaft is transmitted to the rotating output shaft can easily be changed by controlling the operation of the generator.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 5A to 5E are timing charts illustrating the operation of this example embodiment, with FIG. 5A being a timing chart showing the shift in accelerator operation amount, FIG. 5B being a timing chart showing the shift in the throttle opening amount, FIG. 5C being a timing chart showing the shift in the accelerator torque of a MG1, FIG. 5D being a timing chart showing the shift in the engine speed, and FIG. 5E being a timing chart showing the shift in acceleration of the vehicle.

DETAILED DESCRIPTION OF EMBODIMENTS

An example embodiment of the control apparatus for a vehicle according to the invention will now be described in detail with reference to FIGS. 1 to 5E. Incidentally, the vehicle in this example embodiment is provided with a hybrid power system 2 that serves as the power system of the vehicle.

Figure 1:
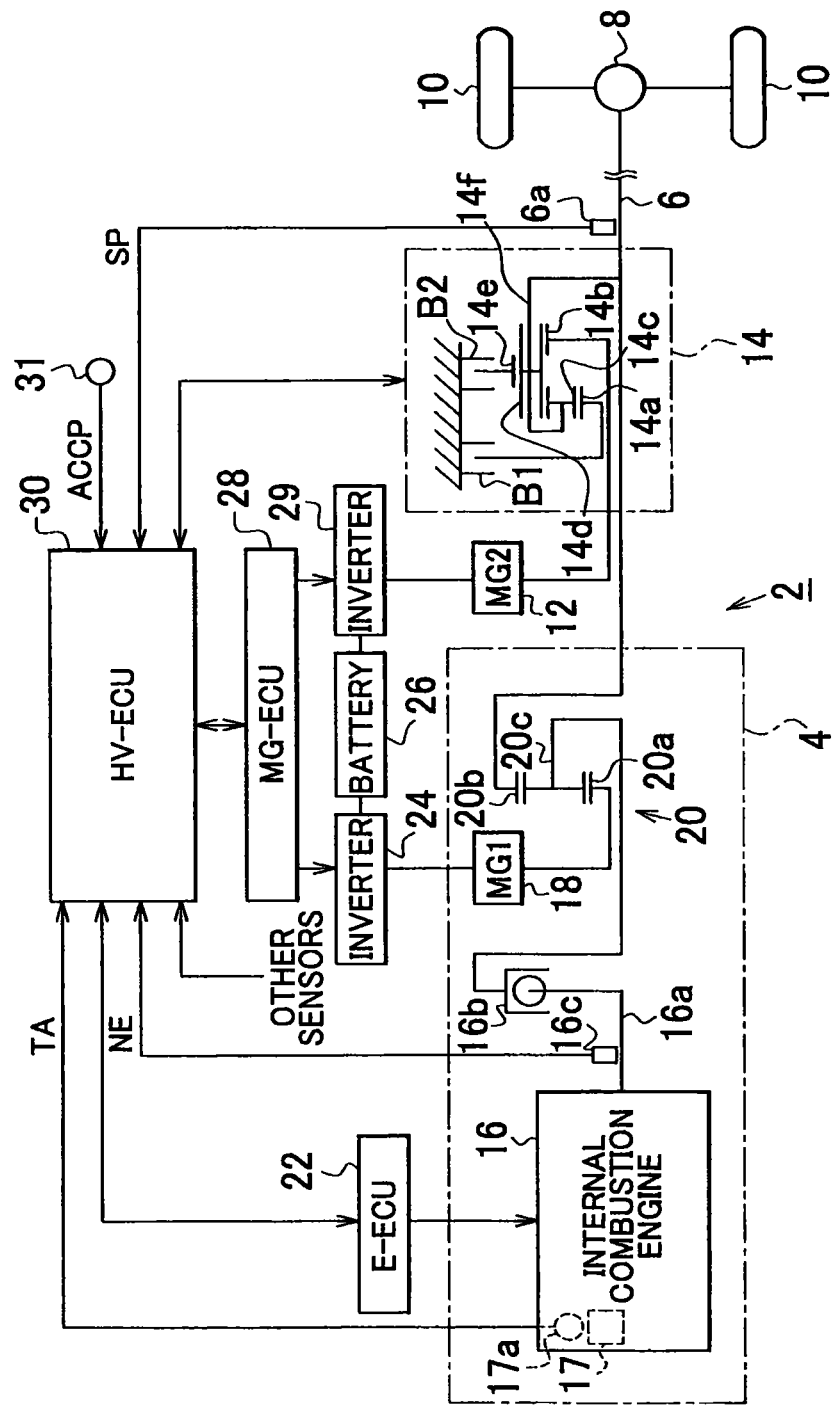
FIG. 1 is a block diagram schematically showing the general structure of a hybrid drive system that serves as the power system of a vehicle in an example embodiment of a control apparatus for a vehicle according to the invention.

FIG. 1 is a block diagram showing the general structure of the hybrid power system 2. As shown in the drawing, in the hybrid power system 2, torque output from a main power source 4 is transmitted to a rotating output shaft 6, and then transmitted as driving force from the rotating output shaft 6 to driving wheels 10 via a differential 8. Also, this hybrid power system 2 is provided with a motor-generator 12 (hereinafter simply referred to as "MG2") that is an assist power source in which both powering control to output driving force for running and regenerative control to recover energy are possible.

The MG2 is connected to the rotating output shaft 6 via a transmission 14. Torque transmitted between the MG2 and the rotating output shaft 6 is increased or decreased according to the speed ratio established in the transmission 14.

The main power source 4 mainly includes an internal combustion engine 16, a motor-generator 18 (hereinafter simply referred to as "MG1"), and a planetary gear set 20 that combines the torque from the internal combustion engine 16 and the MG1 or splits the torque from the internal combustion engine 16 between the MG1 and the driving wheels 10. The internal combustion engine 16 is a gasoline engine and is structured such that the operating state, e.g., the opening amount of a throttle valve 17 that adjusts the intake air amount, the amount of fuel supplied, and the ignition timing, and the like, can be electrically controlled. This control is performed by an electronic control unit (E-ECU) 22 that includes a microcomputer as its main component.

The MG1 is a synchronous electric motor that can function both as an electric motor and a generator, and is connected to a power storage device 26 via an inverter 24. The output torque and regenerated torque of the MG1 are set by controlling the inverter 24 using an electronic control unit (MG-ECU) 28 that includes a microcomputer as its main component. Incidentally, the MG1 and the planetary gear set 20 in this example embodiment together function as a continuously variable transmission mechanism of the invention. That is, the speed ratio when rotational driving force of a crankshaft 16a is transmitted to the rotating output shaft 6 is steplessly changed by controlling the operation of the MG1 using the MG-ECU 28.

The MG2 is connected to the power storage device 26 via an inverter 29. Powering and regeneration, as well as the torque in both of these cases, are controlled by the MG-ECU 28 controlling the inverter 29.

The planetary gear set 20 is a gear mechanism that performs a differential operation with three rotating elements, i.e., a sun gear 20a, a ring gear 20b that is arranged concentric with the sun gear 20a, and a carrier 20c that rotatably and revolvably retains pinion gears that are in mesh with both the sun gear 20a and the ring gear 20b. The crankshaft 16a that serves as the output shaft of the internal combustion engine 16 is connected via a damper 16b to the carrier 20c, so the carrier 20c serves as the input element.

Figure 2A:
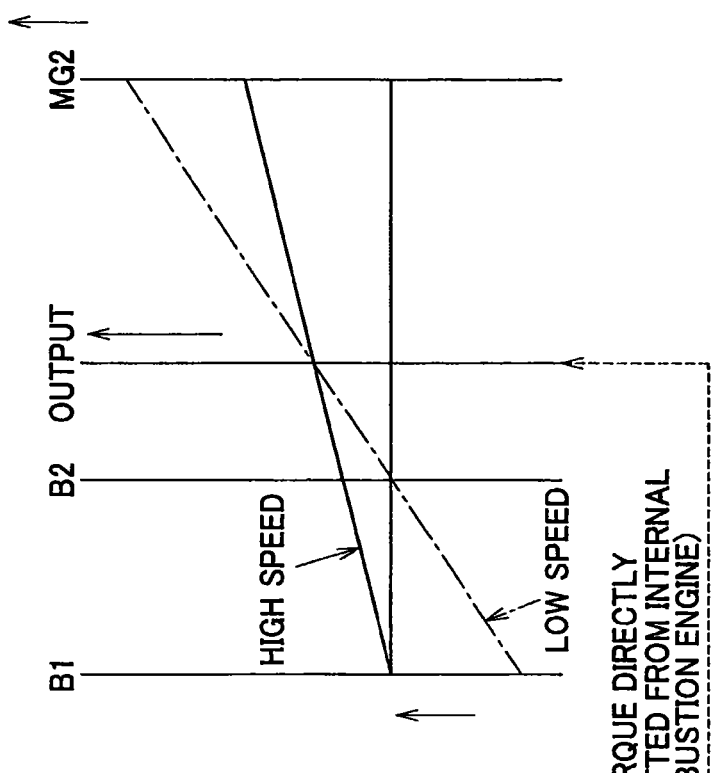
FIG. 2A is an alignment graph of a planetary gear set.

The MG1 is connected to the sun gear 20a, and this sun gear 20a serves as the reaction force element. Therefore, the ring gear 20b is the output element and is connected to the rotating output shaft 6. FIG. 2A is an alignment graph of the planetary gear set 20 that functions as the torque splitting mechanism described above (but can also function as a torque combining mechanism).

As shown in the drawing, the planetary gear set 20 is able to distribute a portion of the power from the internal combustion engine 16 to the rotating output shaft 6 and distribute the rest to the MG1. The transmission 14 is formed by a Ravigneaux type planetary gear set. That is, the transmission 14 has a first sun gear 14a and a second sun gear 14b. A short pinion 14c is in mesh with the first sun gear 14a, and that short pinion 14c and the second sun gear 14b are in mesh with a long pinion 14d that is longer in the axial direction than the short pinion 14c. A ring gear 14e is arranged concentric with the sun gears 14a and 14b, and is in mesh with the long pinion 14d. The pinions 14c and 14d are rotatably and revolvably retained by a carrier 14f. Therefore, the first sun gear 14a and the ring gear 14e, together with the pinions 14c and 14d, form a mechanism that corresponds to a double pinion type planetary gear set. Also, the second sun gear 14b and the ring gear 14e, together with the long pinion 14d, form a mechanism that corresponds to a single pinion type planetary gear set.

Further, the transmission 14 includes a first brake B1 that selectively holds the first sun gear 14a against rotation, and a second brake B2 that selectively holds the ring gear 14e against rotation. These brakes B1 and B2 are formed such that their torque capacities continuously change according to the engaging force generated by hydraulic pressure or electromagnetic force or the like. Incidentally, hydraulic pressure is used in this example embodiment. The MG2 described above is connected to the second sun gear 14b, and the carrier 14f is connected to the rotating output shaft 6.

Therefore, the input element of the transmission 14 is the second sun gear 14b and the output element of the transmission 14 is the carrier 14f. In this transmission 14, a high speed in which a speed ratio smaller than 1 is established by engaging the first brake B1, and a low speed in which the speed ratio is larger than the speed ratio of the high speed is established by engaging the second brake B2 instead of the first brake B1. A shift between these speeds is executed based on the running state such as the vehicle speed SP and the required driving force (or the accelerator operation amount ACCP) and the like. More specifically, a speed range is set in the form of a map (i.e., a shift line graph) beforehand, and control is performed to establish one of those two speeds depending on the detected operating state. This kind of control is performed by an electronic control unit (HV-ECU) 30 that includes a microcomputer as its main component.

Figure 2B:
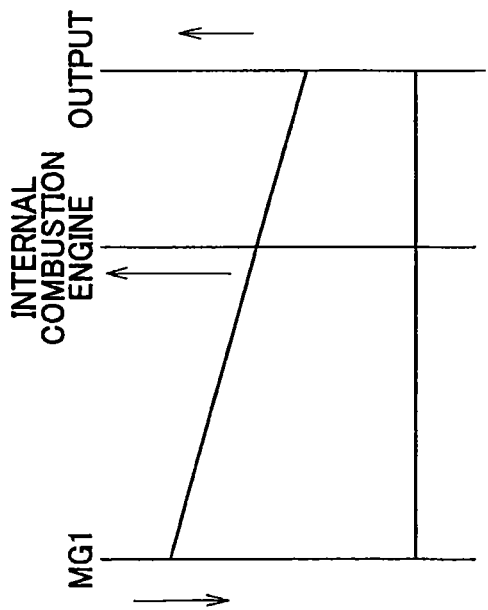
FIG. 2B is an alignment graph of a transmission.

FIG. 2B is an alignment graph of the transmission 14. As shown in the drawing, when the ring gear 14e is held stationary by the second brake B2, the low speed is established such that the torque output from the MG2 is multiplied according to the speed ratio and then applied to the rotating output shaft 6. When the first sun gear 14a is held stationary by the first brake B1, the high speed in which the speed ratio is smaller than it is in the low speed is established. The speed ratio of this high speed is also smaller than 1, so the torque output from the MG2 is increased according to that speed ratio and then applied to the rotating output shaft 6.

In a state in which the high speed or the low speed is constantly established, the torque that is applied to the rotating output shaft 6 is the output torque of the MG2 after it has been increased according to the speed ratio. Incidentally, the detection results from various sensors that detect the operating state of the engine and the running state of the vehicle are input to the HV-ECU 30. Some examples of these sensors include an accelerator operation amount sensor 31 that detects the accelerator operation amount ACCP which is the requirement of driving force by the driver, an engine speed sensor 16c that detects the engine speed NE which is the rotation speed of the crankshaft 16a of the internal combustion engine 16, a throttle opening amount sensor 17a that detects the opening amount of the throttle valve 17 (hereinafter simply referred to as "throttle opening amount" TA), and a vehicle speed sensor 6a that detects the rotation speed of the rotating output shaft 6, i.e., the vehicle speed SP. The E-ECU 22, the MG-ECU 28, and the HV-ECU 30 are all connected together so as to be able to communicate with one another.

Figure 3:
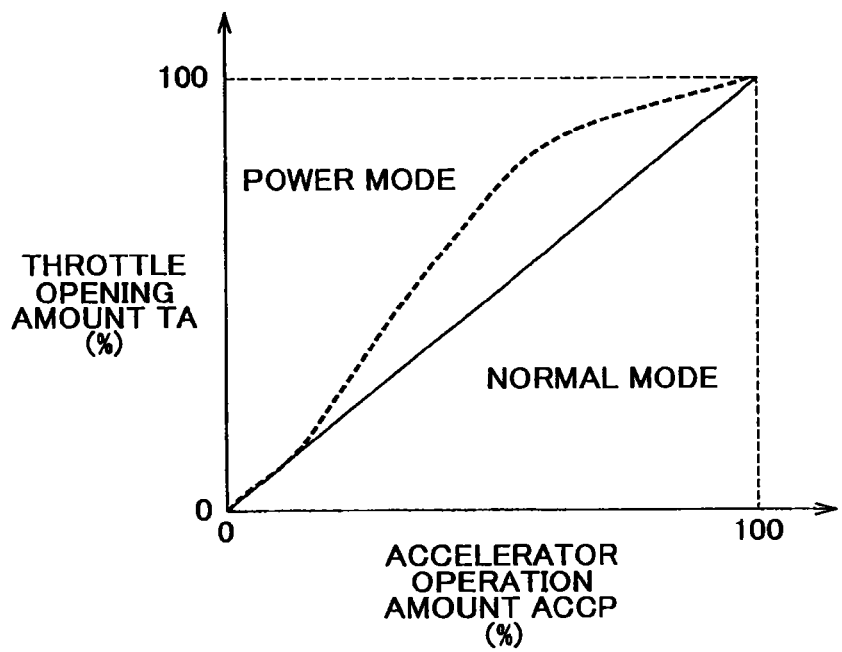
FIG. 3 is a map that defines the relationship between accelerator operation amount and throttle opening amount.

Now, the vehicle in this example embodiment has a normal mode and a power mode as vehicle driving characteristics in order to meet the high requirements of the driver for driving force. The vehicle driving characteristic is changed by changing the output characteristic of the internal combustion engine 16 according to the mode selected by the driver. More specifically, as shown in FIG. 3, control is performed such that the throttle opening amount TA with respect to the accelerator operation amount ACCP is greater when the power mode is selected than it is when the normal mode is selected. This kind of control enables a greater feeling of acceleration to be obtained when the power mode is selected than is obtained when the normal mode is selected. Incidentally, the switch between the normal mode and the power mode is performed by an operation of a switch, not shown, provided in the vehicle cabin. A signal from the switch is output to the HV-ECU 30.

In the control described above, the vehicle driving characteristic is changed by changing the control characteristic of the throttle opening amount TA with respect to the accelerator operation amount ACCP so that it is different for the normal mode from it is for the power mode. Therefore, a problem may arise when the vehicle is accelerating with the accelerator operation amount ACCP at the maximum amount, for example. That is, when the accelerator operation amount ACCP at the maximum amount, the throttle opening amount TA is also the maximum amount as a result, so the required output of the internal combustion engine 16 is the same when the power mode is selected as it is when the normal mode is selected. In this case, the throttle opening amount TA is unable to be increased any more with respect to the accelerator operation amount ACCP. Therefore, even though the power mode is selected, a greater feeling of acceleration as compared to the feeling of acceleration when the normal mode is selected is unable to be obtained.

Thus, in this example embodiment, when the engine speed NE is increased to a target speed NEtrg when the accelerator operation amount ACCP is substantially equal to the maximum amount, the MG1 is controlled such that the rate of increase of the engine speed NE is greater when the power mode is selected than it is when the normal mode is selected. This kind of control quickly increases the acceleration G of the vehicle to a predetermined acceleration, and thus increases the rate of increase when the acceleration G of the vehicle is increased, i.e., increases jerk J. As a result, a greater feeling of acceleration can be obtained when the power mode is selected than can be obtained when the normal mode is selected, even when the accelerator operation amount ACCP is substantially equal to the maximum amount.

Here, the reason why it is possible to quickly increase the acceleration G of the vehicle to a predetermined acceleration, and thus increase the jerk J of the vehicle, by increasing the rate of increase of the engine speed NE will now be described. When the accelerator operation amount ACCP is substantially equal to the maximum amount, i.e., when the required power of the internal combustion engine 16 is the same when the power mode is selected as it is when the normal mode is selected, the engine speed NE is quickly increased to the target speed NEtrg by controlling the MG1 such that the rate of increase of the engine speed NE becomes greater when the power mode is selected than when the normal mode is selected. Increasing the percentage of output from the internal combustion engine 16 that contributes to an increase in engine speed NE in this way results in a decrease in the percentage of output from the internal combustion engine 16 that contributes to an increase in driving force transmitted to the rotating output shaft 6, and thus a decrease in the acceleration G of the vehicle until the engine speed NE reaches the target speed NEtrg. However, once the engine speed NE has reached to the target speed NEtrg, the majority of the output from the internal combustion engine 16 is contributed to increasing the driving force transmitted to the rotating output shaft 6, so the acceleration G of the vehicle abruptly increases. Therefore, increasing the rate of increase of the engine speed NE enables the acceleration G of the vehicle to be quickly increased to a predetermined acceleration, so the jerk J of the vehicle can be made large.

Figure 4:
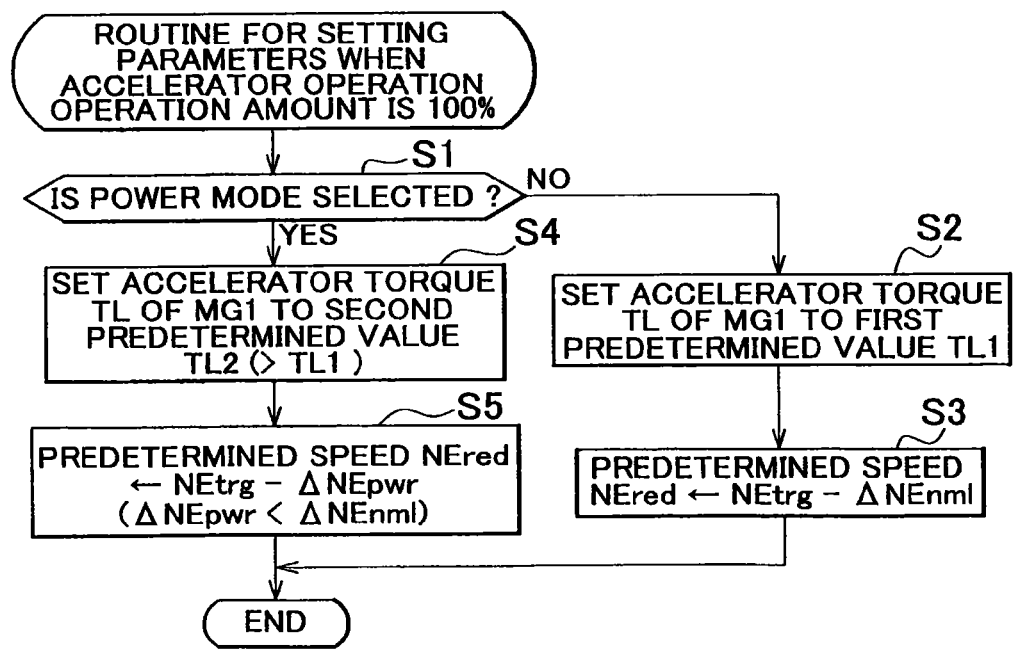
FIG. 4 is a flowchart illustrating a routine for setting the parameters in this example embodiment.

A routine for setting the parameters when the accelerator operation amount ACCP is substantially equal to the maximum amount according to this example embodiment will now be described with reference to FIG. 4, which is a flowchart illustrating this routine. The routine shown in FIG. 4 is executed when the accelerator operation amount ACCP is substantially equal to the maximum amount.

As shown in the drawing, in this routine it is first determined whether the power mode is selected (step S1). Here, if the power mode is not selected (i.e., NO in step S1), i.e., if the normal mode is selected, then the accelerator torque TL of the MG1 is set to a first predetermined value TL1 (step S2). This accelerator torque TL is torque that is output from the MG1 and contributes to an increase of the rate of increase of the engine speed NE. The rate of increase of the engine speed NE increases as the value of this accelerator torque TL becomes larger. Next, a predetermined speed NEred is set to a value equal to the difference of the target speed NEtrg minus a normal mode predetermined value ΔNEnml (i.e., NEred=NEtrg−ΔNEnml) (step S3). Here, the predetermined speed NEred is a speed that defines the timing at which, while the engine speed NE is being increased to the target speed NEtrg, the rate of increase in the engine speed NE is reduced. Then this cycle of the routine ends.

The reason for reducing the rate of increase of the engine speed NE once the engine speed NE has been increased to the predetermined speed NEred that is lower than the target speed NEtrg in this way will now be described. If the engine speed NE is abruptly stopped from increasing after being increased to the target speed NEtrg, the sudden change in acceleration of the engine speed NE will jolt parts of the internal combustion engine 16, which may result in mechanical damage to the internal combustion engine 16. Therefore, by reducing the rate of increase of the engine speed NE after the engine speed NE has been increased to the predetermined speed NEred that is lower than the target speed NEtrg, as described above, an abrupt change in the acceleration of the engine speed NE can be suppressed, thus inhibiting the internal combustion engine 16 from being mechanically damaged.

On the other hand, if it is determined in step S1 that the power mode is selected (i.e., YES in step S1), then the accelerator torque TL of the MG1 is set to a second predetermined value TL2 that is larger than the first predetermined value TL1 (i.e., TL2>TL1) (step S4). As described above, the rate of increase of the engine speed NE increases as the value of the accelerator torque TL becomes larger. Next, the predetermined speed NEred is set to a value equal to the difference of the target speed NEtrg minus a power mode predetermined value ΔNEpwr that is less than normal mode predetermined value ΔNEnml (i.e., ΔNEpwr<ΔNEnml) (i.e., NEred=NEtrg−ΔNEpwr) (step S3). Then this cycle of the routine ends.

Setting the predetermined speed NEred larger when the power mode is selected than when the normal mode is selected in this way enables the engine speed NE to be increased to the target speed NEtrg more quickly compared to when the predetermined speed NEred is the same for the power mode as it is for the normal mode. Therefore, the acceleration G of the vehicle can be increased more quickly to a predetermined acceleration. Also, the jerk J of the vehicle can be made even larger.

Next, the operation of this example embodiment will be described with reference to the timing charts shown in FIGS. 5A to 5E. Incidentally, FIG. 5A is a timing chart showing the shift in accelerator operation amount ACCP, FIG. 5B is a timing chart showing the shift in the throttle opening amount TA, FIG. 5C is a timing chart showing the shift in the accelerator torque TL of the MG1, FIG. 5D is a timing chart showing the shift in the engine speed NE, and FIG. 5E is a timing chart showing the shift in acceleration G of the vehicle. Also, in the drawings, the broken lines indicate shifts in the parameters when the normal mode is selected as the vehicle driving characteristic, and the solid lines indicate shifts the parameters when the power mode is selected as the vehicle driving characteristic.

As shown in the drawings, at timing t1, the accelerator operation amount ACCP is 100% (i.e., the accelerator operation amount ACCP is equal to the maximum amount and, more specifically, the accelerator pedal is fully depressed) (FIG. 5A), and consequently, the throttle opening amount TA is also 100% (i.e., the throttle opening amount TA is equal to the maximum amount and, more specifically, the throttle valve is fully opened) (FIG. 5B).

Here, when the normal mode is selected, as shown by the broken lines in the drawings, the accelerator torque TL of the MG1 is set to the first predetermined value TL1 which is relatively small (FIG. 5C). Also, the engine speed NE increases as the throttle opening amount TA increases (FIG. 5D). Once the engine speed NE reaches a predetermined speed NEred1, which is relatively low, at timing t4, it then increases at a slower rate until it reaches the target speed NEtrg at timing 6 (FIG. 5D). Also, from timing t1, the acceleration G of the vehicle gradually increases over time until maximum acceleration is reaches at timing t6 (FIG. 5E). In this way, when the engine speed NE is increased to the target speed NEtrg when the normal mode is selected, the operation of the MG1 is controlled so that the driving force transmitted to the rotating output shaft 6, of the output of the internal combustion engine 16, increases.

On the other hand, when the power mode is selected, as shown by the solid lines in the drawings, the accelerator torque TL of the MG1 is set to the second predetermined value TL2 which is relatively large (FIG. 5C). Also, the engine speed NE increases as the throttle opening amount TA increases. Because the accelerator torque TL2 of the MG1 is larger than it is when the normal mode is selected, the rate of increase of the engine speed NE is greater than it is when the normal mode is selected (FIG. 5D). Therefore, the engine speed NE reaches a predetermined speed NEred2, which is relatively high, at timing t2. After that, the engine speed NE increases at a slower rate until it reaches the target speed NEtrg at timing t3 (FIG. 5D). Also, from timing t1, the acceleration G of the vehicle temporarily increases, but then gradually decreases over time until timing t3 when the engine speed NE reaches the target speed NEtrg. In this way, when the power mode is selected, the operation of the MG1 is controlled so that the driving force transmitted to the rotating output shaft 6, of the output of the internal combustion engine 16, decreases when the engine speed NE is increased to the target speed NEtrg. Then after timing t3, the acceleration G of the vehicle abruptly increases until maximum acceleration is reached at timing t5 (FIG. 5E). Here, the period from timing t3 to timing t5 is when the jerk J of the vehicle is greatest.

The operation and effects described below are able to be obtained with the control apparatus for a vehicle according to the example embodiment described above.

(1) The provided MG1 that steplessly changes speed ratios when the rotational driving force of the crankshaft 16a is transmitted to the rotating output shaft 6. Also, when the engine speed NE is increased to the target speed NEtrg when the accelerator operation amount ACCP is substantially equal to the maximum amount, the HV-ECU 30 executes control to operate the MG1 such that the rate of increase of the engine speed NE becomes greater when the power mode is selected than it does when the normal mode is selected. This kind of control enables the acceleration G of the vehicle to quickly be increased to a predetermined acceleration. Also, the rate of increase when the acceleration G of the vehicle is increased, or so-called jerk J, can be made large. Therefore, a greater feeling of acceleration can be obtained when the power mode is selected than when the normal mode is selected, even if the required output of the internal combustion engine 16 is the same when the power mode is selected as it is when the normal mode is selected.

(2) When the engine speed NE is increased to the target speed NEtrg when the power mode is selected, control is executed to operate the MG1 such that the driving force transmitted to the rotating output shaft 6, of the output of the internal combustion engine 16, decreases. When the engine speed NE is increased to the target speed NEtrg when the power mode is selected, the output of the internal combustion engine 16 that contributes to an increase of the engine speed NE increases by the amount that the driving force transmitted to the rotating output shaft 6, of the output of the internal combustion engine 16, decreases, which enables the engine speed NE to be increased to the target speed NEtrg more quickly. Therefore, the acceleration G of the vehicle can be quickly increased to a predetermined acceleration, and the jerk J of the vehicle can be made large.

(3) After the engine speed NE has been increased to the predetermined speed NEred, which is lower than the target speed NEtrg, the rate of increase of the engine speed NE is reduced. Also, the predetermined speed NEred is set higher when the power mode is selected than it is when the normal mode is selected. This kind of control enables the engine speed NE to be quickly increased to the target speed NEtrg. Therefore, the acceleration G of the vehicle can be quickly increased to a predetermined acceleration, and the jerk J of the vehicle can be made large.

(4) The provided hybrid power system 2 distributes a portion of the output from the internal combustion engine 16 to the rotating output shaft 6, generates electric power by distributing the rest of the output from the internal combustion engine 16 to the MG1, charges the power storage device 26 with that generated electric power, and transmits power to the rotating output shaft 6 using the MG2 that is driven by the electric power from the MG1 and/or the electric power from the power storage device 26. Also, the speed ratio when the rotation driving force of the crankshaft 16a is transmitted to the rotating output shaft 6 is steplessly changed by controlling the operation of the MG1. Therefore, the speed ratio when the rotation driving force of the crankshaft 16a is transmitted to the rotating output shaft 6 can be easily changed.

Incidentally, the control apparatus for a vehicle according to the invention is not limited to the structure described in the foregoing example embodiment, but may be modified appropriately. For example, the invention may also be carried out as follows. In the example embodiment described above, the internal combustion engine is described as a gasoline engine, but it may also be a diesel engine.

The example embodiment described above describes a vehicle provided with the hybrid power system 2 that distributes a portion of the output from the internal combustion engine 16 to the rotating output shaft 6, generates electric power by distributing the rest of the output from the internal combustion engine 16 to the MG1, charges the power storage device 26 with the generated electric power, and transmits power to the rotating output shaft 6 using the MG2 that is driven by the electric power from the MG1 and/or the electric power from the power storage device 26. That is, the example embodiment describes a vehicle provided with the MG1 and the planetary gear set 20 as the continuously variable transmission mechanism that steplessly changes speed ratios when the rotational driving force of the crankshaft 16a is transmitted to the rotating output shaft 6. However, the continuously variable transmission mechanism according to the invention is not limited to being this kind of electric continuously variable transmission mechanism. Alternatively, a mechanical continuously variable transmission mechanism may be applied. In this case, the speed ratio when the rotational driving force of the crankshaft 16a is transmitted to the rotating output shaft 6 may be steplessly changed by controlling the effective radius of a pulley that forms part of the continuously variable transmission mechanism.

In the example embodiment described above, the rate of increase of the engine speed NE is reduced after the engine speed NE has been increased to the predetermined speed NEred which is lower than the target speed NEtrg. Employing this kind of control mode is preferable for suppressing a sudden change in the acceleration of the engine speed NE, and thus suppressing mechanical damage to the internal combustion engine 16. However, the control of the engine speed NE according to the invention is not limited to this. That is, this kind of control mode does not have to be employed.

In the example embodiment described above, when the engine speed NE is increased to the target speed NEtrg when the normal mode is selected, the continuously variable transmission mechanism is controlled such that the driving force transmitted to the rotating output shaft 6, of the output from the internal combustion engine 16, increases, i.e., such that the acceleration G of the vehicle increases. However, the control of the engine speed NE when the normal mode is selected is not limited to this. As long as the rate of increase when the engine speed NE is increased to the target speed NEtrg is made smaller when the normal mode is selected than it is when the power mode is selected, the continuously variable transmission mechanism may also be controlled such that the driving force transmitted to the rotating output shaft 6, of the output from the internal combustion engine 16, decreases.

In the example embodiment described above, when the engine speed NE is increased to the target speed NEtrg when the power mode is selected, the continuously variable transmission mechanism is controlled such that the driving force transmitted to the rotating output shaft 6, of the output from the internal combustion engine 16, decreases, i.e., such that the acceleration G of the vehicle decreases. However, the control of the engine speed NE when the power mode is selected is not limited to this. As long as the rate of increase when the engine speed NE is increased to the target speed NEtrg is greater when the power mode is selected than it is when the normal mode is selected, the continuously variable transmission mechanism may also be controlled such that the driving force transmitted to the rotating output shaft 6, of the output from the internal combustion engine 16, is increased.

In the example embodiment described above, when the engine speed NE is increased to the target speed NEtrg when the accelerator operation amount ACCP is substantially equal to the maximum amount, the continuously variable transmission mechanism is controlled such that the rate of increase of the engine speed NE becomes larger when the power mode is selected than it does when the normal mode is selected. However, the condition for executing this control of the invention is not necessarily limited to the accelerator operation amount ACCP being substantially equal to the maximum amount.

That is, when the rotation speed of the engine output shaft is increased to the target rotation speed and the required output of the internal combustion engine is the same when the power mode is selected as it is when the normal mode is selected, the continuously variable transmission mechanism may be controlled such that the rate of increase of the rotation speed of the engine output shaft becomes greater when the power mode is selected than it does when the normal mode is selected.

The invention claimed is:

1. A control apparatus for a vehicle in which rotational driving force of an engine output shaft that is an output shaft of an internal combustion engine is transmitted to a driving wheel via a rotating output shaft, and which has a normal mode and a power mode as vehicle driving characteristics, the control apparatus comprising:
a continuously variable transmission mechanism that steplessly changes a speed ratio when the rotational driving force of the engine output shaft is transmitted to the rotating output shaft; and
a control portion that, when a required output of the internal combustion engine when the power mode is selected is the same as a required output of the internal combustion engine when the normal mode is selected, in a case where the power mode is selected, and when a rotation speed of the engine output shaft is increased to a target rotation speed, controls the continuously variable transmission mechanism such that the driving force transmitted to the rotating output shaft, from the engine output shaft, decreases, so that a rate of increase in the rotation speed of the engine output shaft is greater than a rate of increase in the rotation speed of the engine output shaft in a case where the normal mode is selected.

2. The control apparatus according to claim 1, wherein a throttle valve of the internal combustion engine is fully open when an accelerator operation amount is substantially equal to a maximum amount; and the required output of the internal combustion engine when the power mode is selected is the same as the required output of the internal combustion engine when the normal mode is selected if the accelerator operation amount is substantially equal to the maximum amount.

3. The control apparatus according to claim 2, wherein the opening amount of the throttle valve of the internal combustion engine with respect to the accelerator operation amount is made larger when the power mode is selected than when the normal mode is selected.

4. The control apparatus according to claim 1, further comprising:
a hybrid power system including:
a generator;
an output splitting mechanism that distributes a portion of the output from the internal combustion engine to the rotating output shaft and distributes the rest of the output from the internal combustion engine to the generator;
a power storage device that is charged with the electric power generated by the generator; and
an electric motor that is driven by at least one of the electric power from the generator and the electric power from the power storage device, and transmits power to the rotating output shaft,
wherein the continuously variable transmission mechanism steplessly changes the speed ratio when the rotational driving force of the engine output shaft is transmitted to the rotating output shaft, by control of the generator.

* * * * *